July 11, 1967  J. F. QUAAS  3,330,934
FLUX-COATED CARBIDE WELDING ROD
Filed July 30, 1963
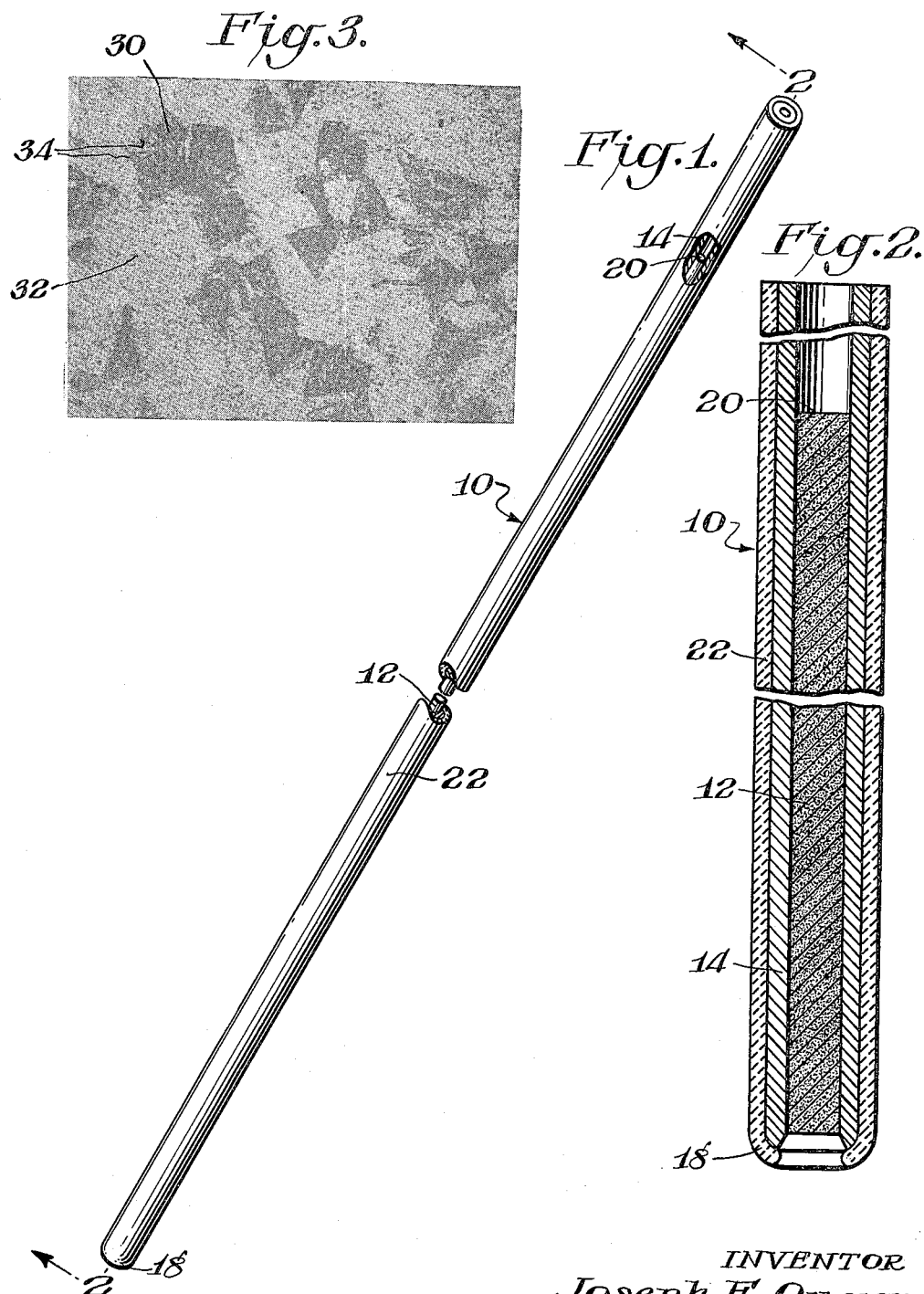
INVENTOR
Joseph F. Quaas
BY Connolly and Hutz
ATTORNEYS 3,330,934
FLUX-COATED CARBIDE WELDING ROD
Joseph F. Quaas, Island Park, N.Y., assignor to Eutectic Welding Alloys Corporation, a corporation of New York
Filed July 30, 1963, Ser. No. 298,715
9 Claims. (Cl. 219—146)

This application is a continuation-in-part of commonly assigned copending application S.N. 181,304, filed Mar. 21, 1962, now Patent No. 3,272,963 issued Sept. 18, 1966, which relates to a welding rod for depositing carbide-laden surface layers upon parent metals.

This invention relates to a flux-coated welding rod for depositing a carbide-laden surface layer upon a parent metal, and it more particularly relates to such a rod which deposits relatively high carbide densities.

That application pertains to a rod in which a mass of fine refractory carbide particles is compressed and sintered in the presence of small amounts of a metallic binder such as cobalt, nickel or molybdenum to fuse it together. An elongated relatively strong metal supporting element is attached alongside the sintered carbide mass and attached to it by fusion or physical connection to prevent the brittle carbide mass from breaking during handling. The supporting element is also capable of fusion with the fine carbide particles and the parent metal under depositing temperatures to provide a means for applying the carbide-laden surface layer upon the parent metal. A reaction flux incorporating carbon and metal powders is applied over the element to make it possible to effectively deposit a high density carbide coating or surface layer including as much as 80% by weight of carbide upon the parent metal. The reason why such high carbide densities can be effectively deposited is not completely understood. However, it is suspected that the reaction flux incorporating carbon and metal powder cooperates with the compressed and sintered core and its metallic binder to protect the carbide particles from being damaged by the welding heat, with a minimum amount of binder metal required in the ultimate deposit.

The hard deposit from the aforementioned type of rod is homogeneous and highly effective for non-cutting service, but the homogeneous dispersion of carbide adjacent each other prevents their hard edges from protruding sufficiently to expose them for cutting operations.

An object of this invention is to provide a welding rod for efficiently depositing high density carbide facings upon parent metals which are suitable for cutting operations; and Another object is to provide such a rod which deposits heterogeneously dispersed carbide-laden facings.

In accordance with this invention a sintered carbide mass is assembled alongside and attached to a metal element, such as one of mild carbon or low alloy steel, capable of fusion with the carbide particles and parent material under depositing temperatures to apply a carbide-laden surface layer upon the parent metal. A reaction flux incorporating from eight to seventy-five percent by weight of carbon and metal powders, the carbon and metal respectively ranging from 10–30 and 70–90% by weight of the powder constituent and specifically in a 20/80 ratio, carbon to metal powder, with approximately ⅛ to ⅔ by weight of the metal powder being ferro-aluminum; and more particularly incorporating the following constituents in the indicated ranges of percentages by weight is applied over the element. This type of rod heterogeneously disperses the carbide particles in the deposit to expose their edges and enhance their cutting action. The carbide mass and metal element respectively comprise from 60–85 and 15–40% by weight of the combined carbide mass and metal element, and the reaction flux comprises from 20–40% by weight of the entire rod.

Constituent:                                   Range
  Active metal fluorides _____    5–35
  Alkaline earth carbonates _____   20–70
  Carbon powder _____    2–35
  Metallic powders _____    6–65
  Ferro-aluminum (15–45% by weight of
     metallic powder constituent).

Novel features and advantages of the present invention will become apparent to one skilled in the art from a reading of the following description in conjunction with the accompanying drawings wherein similar reference characters refer to similar parts and in which:

FIG. 1 is a three dimensional view of one embodiment of this invention; and

FIG. 2 is a cross-sectional view taken through FIG. 1 along the lines 2—2; and

FIG. 3 is a photomicrograph of a carbide-laden surface layer deposited by the embodiment of FIGS. 1 and 2.

In FIG. 1 is shown a welding rod 10 of this invention for depositing a carbide-laden facing upon a parent metal, such as mild steel, by either torch or arc welding procedures. Rod 10 includes a sintered carbide core 12 inserted within a tube 14 and secured within it for example by dipping the carbide core in a light solution of sodium silicate which adheres the core within the tube. In addition the bottom end 18 of tube 14 is inwardly deformed about the bottom of core 12. FIGS. 1 and 2 also illustrate that the top 20 of core 12 is downwardly spaced a short distance, such as for one inch, from the top of tube 14 to avoid wasting the more expensive carbides in the portion of the rod gripped in a holder. Tube 14 is made of mild carbon or low alloy steel containing up to 1.0% of carbon, and the expression mild alloy steel is used herein to embrace that class of steel.

Core 12 is a sintered carbide mass, such as tungsten carbide, incorporating a conventional carbide binder such as cobalt, nickel or molybdenum. It is made by extruding a mass of relatively fine refractory carbide particles approximately 325 mesh or finer. These refractory carbides may be composed of any one of the carbides of metals such as tungsten, molybdenum, vanadium, titanium or columbium. These particles are mixed with a small amount such as 6 or 8% of a binder metal such as cobalt, molybdenum or nickel and pressed into an elongated rod form in a hydraulic press under high pressures to densely compact the mass. This mass is then sintered in a hydrogen furnace for example at 2400° F. to cause the binder to consolidate the mass and protect the carbide particles. This mass is very hard but brittle, and it is accordingly protected from breaking by attachment to a rod of a relatively strong and durable metal. This rod may for example be made in the form of a tube 14 within which carbide mass 12 is inserted. It is also possible to extrude the carbides about the outside of the supporting rod or to insert the carbides into a strip of metal which is later rolled to form a tube which encloses the sintered carbides.

As shown in FIGS. 1 and 2, tube 14 is covered with a flux coating 22, which remarkably facilitates deposition of the carbide coating and accordingly deposits extremely thin facings with high carbide concentrations. This provides maximum hardness with the use of minimum amount of expensive hard carbide material. This flux coating can be formulated as set forth in the following table.

| Constituent | Percent by Weight | |
|---|---|---|
| | Range | Example |
| Active metal fluoride, such as calcium, potassium and sodium | 5-35 | 17 |
| Alkaline earth metal carbonates such as calcium, barium and strontium | 20-70 | 32.5 |
| Carbon Powder | 2-35 | 15 |
| Metallic powder, such as chromium, titanium, boron, vanadium, columbium and molybdenum and silicon | 6-65 | 35.5 |

NOTE.—Ferro-Aluminum (15-45% by weight of metallic powder constituent and particularly 30% by weight thereof).

Ferro-aluminum is an alloy consisting of approximately 50% by weight each of aluminum and iron with the average running between 48 and 52%. It can also include up to a maximum each of: .50 copper, .75 magnesium, .75 manganese, .50 zinc.

When such a rod is formulated with a sintered carbide core 12 having a cobalt binder inserted in a tube 14 made of mild carbon steel and a coating as set forth in the example in the aforegoing table utilizing calcium fluoride and carbonate and a mixture of the indicated metal powders, it provides a remarkably thin and dense carbide coating upon a steel parent material having a hardness ranging between 60 and 65 on the Rockwell "C" scale. Such results are quite unique for deposited carbide coatings. In such an example the following percents by weight are utilized.

Core—73% by weight of core and tube.
Tube—27% by weight of the core and tube.
Flux coating—28% by weight of entire rod.

The reason for the remarkable results of this invention are not completely understood, but it is believed that the density and distribution of carbides is facilitated by the formation of intermetallic carbides in the welding heat with the carbides being protected by the reaction flux. The high density of carbides also contributes maximum carbide density to the deposit. Such a welding rod therefore makes it possible to deposit hard carbide facings as thin as 1/16 inch when the rod is weaved during depositing to provide wide and flat bands of wear-resistant material.

The described flux coating provides remarkable wetting between the deposit and parent metal and facilitates the formation of intermetallic carbides such as iron and nickel with the tungsten and other refractory carbide-forming metals. Alloying agents such as chromium, molybendum and cobalt also produce additional carbides, and the powdered metallics in the flux contribute to this action.

The rod of this invention unexpectedly heterogeneously disperses carbide particles 30 in the matrix metal 32 of a deposited carbide-laden surface layer. The jagged edges 34 of particles 30 are accordingly exposed by selective wear of relatively softer matrix 32 to provide effective cutting action as well as wear resistance.

What is claimed is:

1. A rod for depositing a refractory carbide-laden surface layer upon a parent metal comprising an elongated compressed and sintered mass of fine carbide particles, a metallic binder cementing said mass of fine carbide particles together, an elongated mild alloy steel supporting element disposed alongside and attached to said carbide mass capable of fusion with said fine carbide particles and said parent metal, a flux coating upon the outer surface of said element and carbide mass, said flux coating incorporating approximately 8-75% by weight of powdered carbon and powdered metals capable of reacting to form carbides in the presence of welding heat, said powdered metals comprising from 70-90% by weight of said powdered carbon and metals, said carbide mass and said steel element respectively comprising approximately from 60-85 and 15-40% by weight of their combination, said flux coating comprising approximately from 20-40% by weight of the entire flux coated rod, and said powdered metals including approximately from ⅛ to ⅔ by weight of said powdered metals of ferro-aluminum to heterogeneously disperse said carbide particles in the layer deposited from said rod.

2. A rod as set forth in claim 1 wherein said flux coating essentially consists of the following constituents in the indicated ranges of percentages by weight which are attached to the outer surface of said element and carbide mass by a suitable binder:

| Constituent: | Range |
|---|---|
| Active metal fluorides | 5-35 |
| Alkaline earth metal carbonates | 20-70 |
| Carbon powder | 2-35 |
| Metallic powders | 6-65 |

Ferro-aluminum content in said metallic powders ranging approximately from 15-45% by weight thereof.

3. A rod as set forth in claim 2 wherein said active metal fluoride is calcium fluoride, and said alkaline earth metal carbonate is calcium carbonate.

4. A rod as set forth in claim 3 wherein said metallic powder incorporates metals selected from the group consisting of chromium, titanium, boron, vanadium, columbium, molybdenum, aluminum and silicon powders.

5. A rod as set forth in claim 1 wherein said carbide mass comprises sintered tungsten carbide.

6. A rod as set forth in claim 5 wherein said mild alloy steel comprises mild carbon steel.

7. A rod as set forth in claim 6 wherein said steel element is a tube, and said sintered carbide mass is a sintered tungsten carbide rod inserted within said tube.

8. A rod as set forth in claim 7 wherein said flux coating essentially consists of the following constituents in the indicated ranges of percentages by weight which are attached to said tube by a suitable binder:

| Constituent: | Range |
|---|---|
| Active metal fluorides | 5-35 |
| Alkaline earth metal carbonates | 20-70 |
| Carbon powder | 2-35 |
| Metallic powders | 6-65 |

Ferro-aluminum content in said metallic powders ranging approximately from 15-45% by weight thereof.

9. A rod as set forth in claim 8 wherein said active metal fluoride is calcium fluoride, and said alkaline earth metal carbonate is calcium carbonate.

References Cited

UNITED STATES PATENTS

| 2,806,129 | 9/1957 | Cape | 219—146 |
| 2,848,596 | 8/1958 | Strohmeier et al. | 219—146 |
| 3,004,873 | 10/1961 | Strohmeier et al. | 117—207 X |

RICHARD M. WOOD, *Primary Examiner.*

R. F. STAUBLY, *Assistant Examiner.*